United States Patent [19]
McBain et al.

[11] Patent Number: 5,491,184
[45] Date of Patent: * Feb. 13, 1996

[54] UNSATURATED POLYESTER-MODIFIED FLEXIBLE COPOLYMERS FOR USE IN SHEET MOLDING COMPOSITIONS

[75] Inventors: Douglas S. McBain, Norton; Earl G. Melby, Uniontown; Kevin P. LaJudice, Akron, all of Ohio

[73] Assignee: GenCorp. Inc., Fairlawn, Ohio

[*] Notice: The portion of the term of this patent subsequent to Jun. 27, 2012, has been disclaimed.

[21] Appl. No.: 329,358

[22] Filed: Oct. 26, 1994

Related U.S. Application Data

[63] Continuation of Ser. No. 1,489, Jan. 7, 1993, Pat. No. 5,385,963, which is a continuation-in-part of Ser. No. 828,080, Jan. 30, 1992, Pat. No. 5,362,819.

[51] Int. Cl.$^6$ .......................... C08L 67/06; C08L 63/10
[52] U.S. Cl. .......................... 523/436; 523/522; 525/31; 525/43; 525/44; 525/438; 525/444; 525/445; 525/531
[58] Field of Search .................. 525/43, 44, 438, 525/444, 445, 531, 31; 523/436, 522

[56] References Cited

U.S. PATENT DOCUMENTS

| | | |
|---|---|---|
| 2,750,314 | 6/1956 | Bemmels . |
| 2,829,131 | 4/1958 | Greenspan et al. . |
| 2,838,478 | 6/1958 | Hillyer et al. . |
| 3,119,711 | 1/1964 | Starmann . |
| 3,429,951 | 2/1969 | Childers . |
| 3,437,517 | 4/1969 | Eilerman . |
| 3,538,043 | 11/1970 | Herold . |
| 3,555,112 | 1/1971 | Winkler . |
| 3,651,014 | 3/1972 | Witsiepe . |
| 3,718,714 | 2/1973 | Comstock . |
| 3,827,230 | 8/1974 | Marzocchi et al. . |
| 3,888,645 | 6/1975 | Marzocchi . |
| 4,020,036 | 4/1977 | South, Jr. . |
| 4,031,165 | 6/1977 | Saiki et al. . |
| 4,051,199 | 9/1977 | Udipi et al. . |
| 4,076,767 | 2/1978 | Samejima . |
| 4,131,725 | 12/1978 | Udipi . |
| 4,242,415 | 12/1980 | Feltzin et al. . |
| 4,255,299 | 3/1981 | Daimon . |
| 4,290,939 | 9/1981 | Bertsch . |
| 4,309,473 | 1/1982 | Minamisawa et al. . |
| 4,329,438 | 5/1982 | Yamori et al. . |
| 4,341,672 | 7/1982 | Hsieh et al. . |
| 4,413,072 | 11/1983 | Hess . |
| 4,419,487 | 12/1983 | Rowe . |
| 4,478,963 | 10/1984 | McGarry . |
| 4,515,710 | 5/1985 | Cobbledick . |
| 4,524,178 | 6/1985 | Hefner et al. . |
| 4,530,962 | 7/1985 | Alexander . |
| 4,562,115 | 12/1985 | Hergenrother . |
| 4,748,064 | 5/1988 | Harpell et al. . |
| 4,783,544 | 11/1988 | Yokoshima et al. . |
| 4,833,210 | 5/1989 | Fujii et al. . |
| 4,851,474 | 7/1989 | Willis . |
| 4,851,476 | 7/1989 | Willis . |
| 4,913,955 | 4/1990 | Noda et al. . |
| 4,970,265 | 11/1990 | Willis . |
| 4,981,916 | 1/1991 | Willis . |
| 5,084,508 | 1/1992 | Kagaya et al. . |
| 5,122,553 | 6/1992 | Takayama et al. . |
| 5,385,963 | 1/1995 | McBain ..................................... 525/44 |

FOREIGN PATENT DOCUMENTS

| | | |
|---|---|---|
| 0234902 | 9/1987 | European Pat. Off. . |
| 0242027 | 10/1987 | European Pat. Off. . |
| 0273522 | 6/1988 | European Pat. Off. . |
| 0310167 | 5/1989 | European Pat. Off. . |
| 0317628 | 6/1989 | European Pat. Off. . |
| 305159 | 12/1988 | Japan . |
| 2165548 | 4/1986 | United Kingdom . |

OTHER PUBLICATIONS

Database WPI Sep. 1992, Derwent Publications Ltd. London, GB: AN 92–354793 & JP–A–4 258 637 (Dainippon Ink & Chem KK) 14 Sep. 1992, "Abstract".

Database WPI, Week 9223, Derwent Publications Ltd. London, GB: AN 92–188159 & JP–A–4 121 756 (Fjuitsu Ltd) 22 Apr. 1992, "Abstract".

Journal of Applied Polymer Science, vol. 31, No. 1, Jan. 1986, New York, USA, pp. 55–63, Subhas C. Shit, Beni Madhab Mahoto, Mrinal M. Miati, Sukumar Maitt "New Block Copolymers II. Synthesis and Characterization of an ABA–Type Block Copolymer", Abstract.

Primary Examiner—Patricia A. Short
Attorney, Agent, or Firm—Robert F. Rywalski; Samuel B. Laferty

[57] ABSTRACT

ABA block copolymers having saturated polyester midblocks "B" and unsaturated polyester condensation end blocks A of molecular weight from about 100 to 500 or 600 are described which increase the flexural strain to failure of unsaturated polyester or vinyl ester resins. These ABA block copolymers are generally compatible with unsaturated polyester resins and increase flexural strain by a different mechanism than used by incompatible rubbery polymers. These ABA block copolymers are compatible with the unsaturated polyester compositions and do not phase separate.

20 Claims, 3 Drawing Sheets

UNSATURATED POLYESTER-MODIFIED FLEXIBLE COPOLYMERS FOR USE IN SHEET MOLDING COMPOSITIONS

CROSS REFERENCE

This application is a continuation of application Ser. No. 08/001,489, filed Jan. 7, 1993, of Douglas S. McBain for "Unsaturated Polyester-Modified Flexible Copolymers for Use in Sheet Molding Compositions," now U.S. Pat. No. 5,385,963, issued Jan. 31, 1995, which is a continuation-in-part of Ser. No. 07/828,080, filed Jan. 30, 1992, of Douglas S. McBain et al., for "Polyester-Flexible Polymer Block Copolymers and Mixtures Thereof," now U.S. Pat. No. 5,362,819, issued Nov. 8, 1994.

FIELD OF INVENTION

This invention relates to compatible saturated polyester polymer blocks having terminal alkylene maleate end blocks formulated into an unsaturated polyester or vinyl ester resin composition. These saturated polyester blocks may also have small amounts of aromatic diacids in their polymer backbone. The incorporation of these saturated polyesters, which have a lower Tg than the unsaturated polyesters, gives the composition higher strain to failure or crack values while maintaining high modulus, good molded part surface quality, and low in-mold shrinkage. These compositions are generally used in highly filled, fiber reinforced molded parts.

BACKGROUND

Unsaturated polyester resins are well-known and useful materials for making molding compositions with a broad application in the manufacture of automotive and other products. One of the main deficiencies of cured unsaturated polyesters and fiber reinforced polyesters (FRP's) made from them is the inherent brittleness of the polymer matrix. Cracking at room and elevated temperatures is a principal cause of failure in production and in service of the molded parts.

Improvements in crack resistance in resin materials for SMC's have been reported by the incorporation of flexible ethers (diethylene glycol) or acids (adipic acid) in the unsaturated polyester. This approach using the so-called flexible polyesters has been only moderately successful, since the modulus and high temperature properties of the molded composite significantly decline with increasing amounts of these materials, and frequently they are faulted as sacrificing too much in their mechanical properties and dimensional stability.

Further, rigid unsaturated polyesters which contain a high fumarate content have traditionally given the best surface quality when used with common low profile additives to control shrinkage. Consequently, they have been the materials of choice for Class A automotive panels. As well as showing a great loss of mechanical properties, flexible polyesters sacrifice surface quality even when used with common LPA's. This has discouraged the use of such flexible unsaturated polyesters for vehicle panels.

A number of strategies for improving the toughness and crack resistance of polymeric materials have been demonstrated in thermoset epoxies. The most common and successful technique is the creation of a second elastomeric phase through a phase separation process during cure. This process has found only limited success in unsaturated polyesters for several reasons. The reactive liquid rubbers used to make the elastomer phase contribute to an undesirable high viscosity, the rubber phase separates before curing, and the reactive liquid rubbers contribute to higher shrinkage resulting in poor surface quality of the molded part.

SUMMARY OF THE INVENTION

Block copolymers of ABA structure are disclosed as modifiers for unsaturated polyester or vinyl ester resin compositions. The B block is a saturated polyester having a low Tg with two reactive end groups. The A blocks have a molecular weight of from about 100 to about 500 or 600 and are prepared by an in situ reaction of dicarboxylic anhydrides and cyclic alkylene oxide molecules with the reactive end groups of the B block. Preferably, this reaction is the sequential chemical additions of dicarboxylic anhydride to the B block and then the chemical addition of cyclic alkylene oxide to the reaction product of the B block and the dicarboxylic anhydride, with this process being repeated to generate up to 3 or 4 unsaturated polyester repeat units.

These ABA block copolymers are disclosed in the parent application which is the Detailed Description. The incorporation of one of these block polymers into an unsaturated polyester composition is described in the Detailed Description of a Toughened Composition. The ABA block copolymers of this invention are more compatible with the unsaturated polyester than previous rubbery diene based polymers.

BRIEF DESCRIPTION OF DRAWINGS

FIG. 1 shows the flexural stress/strain curves at 23° C. of the two formulations. FIG. 2 shows the Flexural stress/strain curves at 150° C. of the two formulations. FIG. 3 shows the tensile stress/strain curves at 150° C. of the two formulations.

DETAILED DESCRIPTION

Figure 1:
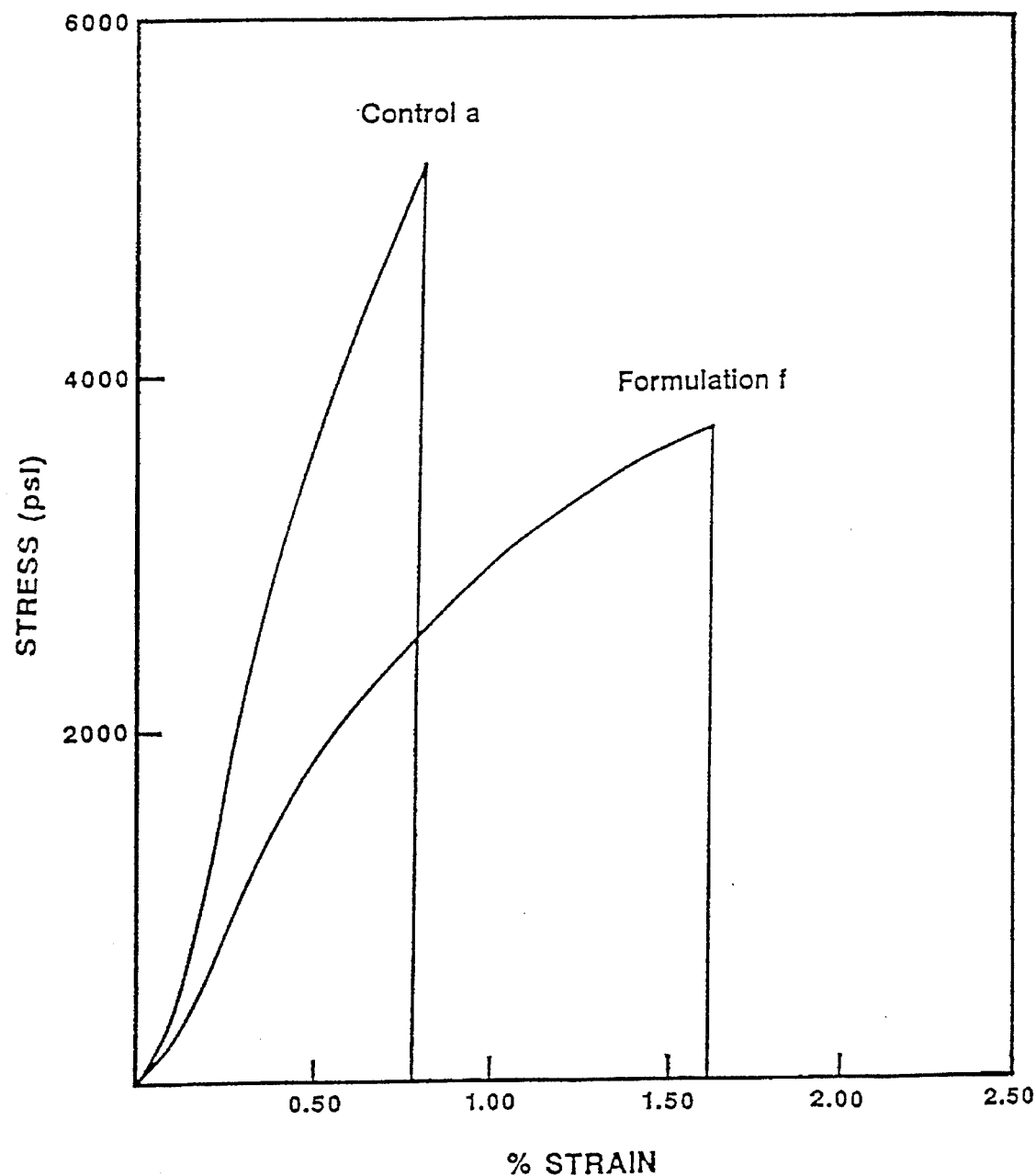
FIGS. 1, 2, and 3 compare the stress/strain curves of an unsaturated polyester control composition and formulation f, which substitutes on an approximately 20 weight percent basis a hydroxypropylmaleate terminated poly(propylene adipate) polymer for a 20 weight percent portion of the polyester resin, low profile additive, styrene, and divinylbenzene in the control composition.

The B portion of the block copolymers of the present invention can generally be any flexible polymer. Such flexible polymers are generally defined as any polymer which has a Tg of about 0° C. or less and preferably below minus 20° C. often are liquid, and are readily known in the art and to the literature, including the preparation thereof.

A preferred class of the B block flexible polymers is the various saturated polyesters made from aliphatic dicarboxylic acids or aliphatic anhydrides and glycols, and such are well known to the art and to the literature, as is the preparation thereof, and are commercially available. The aliphatic dicarboxylic acids and anhydrides have from 1 to 10 carbon atoms, with specific examples including carbonic acid, malonic acid, succinic, glutaric acid, adipic acid, pimelic acid, suberic acid, azelaic acid, sebacic acid, the anhydride counterparts thereof, and the like, with adipic acid generally being preferred. Optionally included within the above aliphatic dicarboxylic acids are minor amounts, that is up to 40 percent by weight based upon a total weight of the acids, of an aromatic diacid such as phthalic acid, isophthalic acid, terephthalic acid, and the like. Mixtures of all of the above acids can be utilized as well. The glycols generally have from 2 to 15 carbon atoms with specific examples including ethylene glycol, propylene glycol, 1,3-butylene glycol, 1,4-butylene glycol, pentane diol, hexane diol, cyclohexanedimethanol dipropylene glycol, diethylene glycol, pinacol, and the like. Preferred glycols include diethylene glycol or a mixture of propylene glycol with ethylene glycol.

The polyester or A block is generally an unsaturated polyester having an average molecular weight of between 100 or 500 to 2,000 or 5,000 and has one, or less desirably two, functional end groups thereon such as hydroxyl, carboxyl, or amine. The polyesters are made by the copolymerization of generally cyclic ethers typically containing 2 or 3 carbon atoms in the ring and an unsaturated anhydride, as well as optional saturated anhydrides using double metal complex cyanide catalysts. Generally any cyclic oxide can be utilized such as 1,2-epoxies, oxetanes, and the like, with the cyclic ether having a total of up to 18 carbon atoms, as for example 2 carbon atoms in the ring and up to 16 carbon atoms in the side chains. Such cyclic oxide monomers can also contain one or more aliphatic double bonds and preferably only contain one aliphatic carbon to carbon double bond. Examples of suitable cyclic oxides include ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl gylcidyl ether, isoheptene oxide, 1,2-octene oxide, methyl glycidyl ether, ethyl glycidyl ether, phenyl glycidyl ether, butadiene monoxide, isoprene monoxide, styrene oxide, tolyl glycidyl ether, 1,2-pentadecene oxide, epichlorohydrin, glycidoxypropyltrimethoxysilane, and the like. Generally, ethylene oxide, propylene oxide, and butylene oxide are preferred.

Generally five-member unsaturated cyclic anhydrides are preferred, especially those having a molecular weight between 98 and 400. Mixed anhydrides as well as mixtures of anhydrides may be used. Examples of preferred anhydrides include those of maleic, phthalic, itaconic, nadic, methyl nadic, hexahydrophthalic, succinic, tetrahydrophthalic, 1,2-naphthalenedicarboxylic, 1,2-tetrahydronaphthalene dicarboxylic acids, and the like. Further examples include such anhydrides in which hydrogen atoms have been substituted by halogen, hydroxyl or $C_{1-8}$ carbon atom alkyl, aryl or aralkyl groups such as the anhydrides of 3,4-dichlorophthalic, hexachlorodicycloheptadiene dicarboxylic (chlorendic), 8-hydroxyl-1,2-naphthalenedicarboxylic, 2,3-dimethyl maleic, 2-octyl-3-ethyl maleic, 4,5-dimethyl phthalic, 2-phenylethyl maleic, 2-tolyl maleic and the like.

As noted above, mixtures of saturated and unsaturated anhydrides can be utilized with generally maleic anhydride being preferred. Such polyesters are known to the art and to the literature and are generally made utilizing double metal cyanide complex catalysts. The method, preparation and scope of the various types of unsaturated polyesters which are suitable in the present invention are described in U.S. Pat. No. 3,538,043 which is hereby fully incorporated by reference with regard to all aspects thereof. For example, suitable catalysts for preparation of the polyester A block include zinchexacyanocobaltate and analogs thereof as well as various metalloporphyrins. Reaction temperatures generally include ambient to about 130° C. with from about 40° to about 80° C. being preferred. Such polyesters if made by utilizing maleic acid, can be isomerized with various conventional amines such as morpholine or piperidine to produce the fumarate isomer, as taught in U.S. Pat. No. 3,576,909, to Schmidle and Schmucker, which is hereby fully incorporated by reference with regard to all aspects thereof. Hydroxyl or carboxyl end groups are readily obtained by simply utilizing either an excess of the glycol or of the acid. Amine groups are added generally by post-reaction with an amine compound such as ethylene diamine, and the like. Such aspects are of course well known to the art and to the literature. Generally, such polyester A blocks have a significant molecular weight, as above 500. A preferred ester of the present invention is poly(propylenefumarate).

The monofunctional terminated unsaturated polyester A block is reacted with the B block flexible polymer to yield a block copolymer. If the flexible B block is monoterminated, an AB type block copolymer will be formed. If the flexible polymer B block is a diterminated functional polymer, an ABA type block copolymer will be formed. However, if a difunctional terminated polyester A block is utilized with a difunctional terminated flexible B block, an ABA type block copolymer is produced along with generally small amounts of an $A(BA)_n$ type block copolymer where n is 2 to 5. Typically, such mixtures contain a majority amount, that is at least 50 percent and often at least 70, 80, or even 90 percent by weight of the ABA block copolymer.

When the flexible polymer B block is hydroxyl terminated, desirably the unsaturated polyester A block contains a monofunctional, or less desirably a difunctional, terminal acid end group so that an ester reaction occurs and an ester linkage is formed. Similarly, if the flexible polymer B block contains a carboxyl terminal group, the unsaturated polyester A block end group is desirably a hydroxyl so that an ester linkage can be formed. In either situation, a conventional esterification reaction is carried out in a manner well known to the art. The net result is the formation of an AB or an ABA block polymer and possible small amounts of $A(BA)_n$ block copolymer having an ester linkage between the blocks.

If the flexible B block is amine terminated, desirably the polyester A block has a monocarboxylic acid functional end group. Such a reaction is carried out in a conventional manner and results in an amide linkage. Alternatively, if the polyester A block is amine-terminated, a diisocyanate can be reacted with a mono- or dihydroxyl terminated B block, so that the reaction product thereof with the amine-terminated A block results in a urea linkage.

Regardless of the type of linkage formed between the "A" block and the "B" block, the reaction conditions for forming such linkages are well known to the art and to the literature, and result in the formation of a novel block copolymer. Such reactions including the conditions thereof, etc., as well as the linkage reactions set forth hereinbelow are more fully defined in *Advanced Organic Chemistry, Reactions, Mechanisms, and Structures*, J. March, 2nd Edition, McGraw Hill, New York, N.Y., 1977, which is hereby fully incorporated by reference including subsequent editions thereof.

It is also within the scope of the present invention to utilize a polyester A segment of very low molecular weight, such as for example from about 100 to about 500 or 600, wherein the ester segment or A block is merely the in situ reaction of a single or a few dicarboxylic anhydride and cyclic oxide molecules, such as maleic anhydride and propylene oxide. Preferably, the flexible B block is hydroxyl terminated. Such low molecular weight polyester A blocks result in a block copolymer having a high ratio or amount of the flexible polymer A block.

To prepare such low molecular weight A segments or blocks, it is advantageous to react the hydroxy terminated flexible B segment directly with the cyclic anhydride and propylene oxide. Suitable catalysts for the reaction include the double metal cyanide complex catalysts described above as well as the various titanates and alkyl substituted tin compounds like dibutyltin oxide. Preferred anhydrides for making such low molecular weight A segments have unsaturation such as maleic, tetrahydrophthalic, itaconic, nadic, methyl nadic and the like, although mixtures of unsaturated and saturated cyclic anhydrides may also be used. Generally, any cyclic oxide can be used with ethylene and propylene oxides being preferred.

According to the preferred embodiment of the present invention, the flexible polymer B block is hydroxyl terminated and is reacted with a monohydroxyl terminated unsaturated polyester A block through the utilization of a polyisocyanate to yield a block copolymer having a minimum weight of 500 or 600. That is, a polyisocyanate is reacted with the hydroxyl end group of the flexible polymer B block thereby leaving a free isocyanate group which is subsequently reacted with the hydroxyl end group of the unsaturated polyester A block. Examples of polyisocyanates which can be utilized generally have the formula $$R(NCO)_n$$

where n is generally about 2 (i.e. a diisocyanate) although it can be slightly higher or lower as when mixtures are utilized. R is an aliphatic having from about 2 to about 20 carbon atoms with from about 6 to about 15 carbon atoms being preferred or an aromatic including an alkyl substituted aromatic having from about 6 to about 20 carbon atoms, with from about 6 to about 15 carbon atoms being preferred, or combinations thereof. Examples of suitable diisocyanates include 1,6-diisocyanato hexane, 2,2,4-and/or 2,4,4-trimethyl hexamethylene diisocyanate, p-and m-tetramethyl xylene diisocyanate, dicyclohexyl-methane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, (IPDI) isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxylbutyl)-succinate (molecular weight=262) with two moles of hexamethylene diisocyanate. TDI and IPDI are preferred for reasons set forth herein below. The reaction between the diisocyanate and the hydroxyl terminated flexible polymeric B block is carried out in an inert atmosphere such as nitrogen, at ambient temperatures and up to 30° C., desirably in the presence of urethane catalysts. Such catalysts are known to the art as well as to the literature and generally include tin compounds such as various stannous carboxylates, for example stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer.

It is an important aspect of the present invention that the reaction of the diisocyanate with mono- or di- hydroxyl terminated flexible polymer B block occurs separately, that is, not in the presence of, in the absence of, or free from the mono- or di- hydroxyl functional unsaturated polyester A block. This ensures that a random copolymer containing block segments therein is not produced. Moreover, it is another important aspect of the present invention to utilize diisocyanates which have differential reaction rates with regard to the two isocyanate end groups. This is to ensure that only one of the groups reacts with the hydroxyl terminated flexible B block and the remaining unit generally remains unreacted until subsequent reaction of the monohydroxyl terminated polyester A block. For this reason, TDI and IPDI are preferred. The amount of the diisocyanate utilized is generally an equivalent mole amount to the hydroxyl groups in the flexible B block and thus is a mole ratio of diisocyanate to hydroxyl groups from about 0.8 to about 1.2, and desirably from about 0.9 to about 1.1. Similarly, the amount of the polyester block A is generally an equivalent amount to the urethane linkages of the flexible B block, be it one linkage or two linkages per B block.

The mono- or di- hydroxyl terminated unsaturated polyester A block is then subsequently added to the vessel or solution containing the urethane terminated flexible polymer B block and reacted therewith in a conventional manner well known to the art and to the literature. The result is a urethane linkage between the polyester A block and the flexible polymer B block.

A distinct advantage of utilizing the urethane reaction route is that a low temperature reaction can be carried out which minimizes side reactions and that no unreacted compounds remain which have to be removed from the reaction product.

Another method of making a mixture of block copolymers containing a large amount of AB block copolymer is to react a diisocyanate-terminated flexible polymer B block having two free NCO groups thereon with an approximately equivalent amount of a low molecular weight alcohol and then subsequently reacting the product with an approximately equivalent amount of the functional terminated unsaturated polyester A block. The flexible polymer B block will contain a mixture of alcohol terminated end groups, unreacted urethane end groups, or both. The low molecular weight alcohol can be methanol, ethanol, n-propanol, isopropanol, t-butanol, and the like. In lieu of the low molecular weight saturated alcohol, a functional compound containing an ethylenically unsaturated poly-merizable group can be utilized, such as hydroxy-styrene, hydroxy-ethyl-acrylate, methacrylate, or allyl alcohol.

Another preferred embodiment relates to the preparation of the low molecular weight A blocks which involves the reaction of hydroxyl terminated B blocks with a cyclic unsaturated anhydride and an alkylene oxide as noted above. Mixtures of saturated and unsaturated anhydrides can also be used.

Another aspect of the present invention is that the above-noted AB, or ABA, or $A(BA)_n$ block copolymers can be cured. Curing can occur utilizing conventional compounds such as ethylenically unsaturated compounds, for example vinyl or allyl compounds, and conventional free radical catalyst. Examples of ethylenically unsaturated compounds include styrene, a preferred compound, vinyl toluene, divinyl benzene, diallyl phthalate, and the like; acrylic acid esters and methacrylic acid esters wherein the ester portion is an alkyl having from 1 to 10 carbon atoms such as methylacrylate, ethylacrylate, n-butylacrylate, 2-ethyl-hexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like, as well as mixtures thereof. The amount of such compounds based upon 100 parts by weight of the block copolymers can generally vary from about 1 to about 500 parts by weight, and desirably from about 1 to about 100 parts by weight. The free radical initiators can include organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

The invention will be understood by reference to the following examples setting forth the preparation of unsaturated polyester-blocked flexible polymer compositions.

EXAMPLE 1

Poly(propylene fumarate)-b-poly(butadiene)-b-poly(propylene fumarate) triblock

In a 1-L resin kettle equipped with thermometer, heating mantle and stirring were charged 203 g (70 mmoles —OH) of BFG Hycar 2000×169 (a dihydroxy-terminated polybutadiene), 263 g of styrene, 15.7 g (141 mmoles total —NCO) of isophorone diisocyanate, 2.3 g of zinc stearate, and 1.4 g of DABCO T9 catalyst. The materials were mixed thoroughly under nitrogen and warmed to 70° C. After two hours 80 g (70 mmoles —OH) of a 80 percent solids in styrene solution of a mono-hydroxy unsaturated polyester (polypropylene fumarate, 850 MW) was added to the reaction mixture, along with 2.5 g of 10 percent benzoquinone in diallyl phthalate, and 0.5 g of DABCO T9 catalyst. The reaction mixture was cooled after three hours to room temperature, and the solution poured into a suitable container. The triblock had a flexible polymer to unsaturated polyester weight ratio of 3.2 to 1.0, and contained 50 percent solids in styrene.

EXAMPLE 2

Poly(propylene fumarate)-b-poly(butadiene-CO-acrylonitrile)-poly(propylene fumarate) triblock The above triblock was prepared by charging a 2-L resin kettle as above with 600 g (370 mmoles —OH) of Hycar 1300×34 (a dihydroxy-terminated poly(butadiene-CO-acrylonitrile, 26 percent AN content) and 480 g of styrene which was stirred overnight under nitrogen to dissolve. To the stirred solution was then added 52 g (600 mmoles total —NCO) of toluene diisocyanate, and 2.0 g DABCO T12 catalyst. The mixture was stirred for one-half hour during which time the temperature rose to 37° C., followed by the addition of 675 g (350 mmoles —OH) of an 80 percent solids in styrene solution of a mono-hydroxy unsaturated polyester (polypropylene fumarate, approx. 1600 MW). The mixture was kept at 37° C. with stirring for six hours, and then poured into a container. The triblock had a flexible polymer to unsaturated polyester weight ratio of 1.1 to 1.0, and contained 65 percent solids in styrene.

EXAMPLE 3

Poly(propylene fumarate)-b-poly(butadiene) block copolymer

The above block copolymer was prepared by charging 200 g (70 mmoles —OH) of Hycar 2000×169 to a 1-L resin kettle along with 234 g of styrene, 12.5 g (113 mmoles total —NCO) isophorone diisocyanate, 2.0 g of zinc stearate, and 2.0 g DABCO T9 catalyst. The starting materials were mixed thoroughly under nitrogen, and then heated to 70° C. After 90 minutes, 1.7 g (28 mmoles —OH) of n-propanol was added, and after 2.5 hours 36 g (32 mmoles) of an 80 percent solids in styrene solution of a monohydroxy unsaturated polyester (polypropylene fumarate, approx. 1400 MW). The mixture was stirred for another three hours, then cooled and transferred to a suitable container. The block copolymer had a flexible polymer to unsaturated polyester weight ratio of 7.0 to 1.0, and contained 53 percent solids in styrene. This composition was a mixture containing large amounts of an AB block copolymer.

EXAMPLE 4

Poly(propylene fumarate)-b-poly(butadiene-CO-acrylonitrile) block copolymer

The above block copolymer was prepared in a 1-L resin kettle as above with a charge of 361 g (225 mmoles —OH) Hycar 1300×34 and 175 g (210 mmoles total —OH) of 80 percent solids in styrene solution of di-hydroxy unsaturated polyester (polypropylene fumarate, approximately 1400 MW), which were mixed thoroughly at 110° C. under vacuum for 90 minutes. The blend was cooled to 80° C. under nitrogen, and 21.6 g (250 mmoles total —NCO) of TDI added followed by stirring for ten minutes. DABCO T-12 catalyst (0.8 g) was added, causing an immediate increase in viscosity. Stirring was continued for one hour and the mixture cooled to 50° C. followed by the addition of 531 g of styrene. The solution was transferred to a suitable container. The flexible polymer to unsaturated polyester weight ratio of this additive was 2.6 to 1.0, and the solution contained 48 percent solids in styrene. This composition was a mixture containing $A(BA)_n$ block copolymers.

EXAMPLE 5

Poly(propylene fumarate)-b-poly(butadiene-co-acrylonitrile) block copolymer

The above block copolymer was prepared by charging a 500-ml resin kettle with 189 g of a solution of Hycar 1300×31 (dicarboxy terminated polybutadiene-co-acrylonitrile, 10 percent AN content; 48.5 weight percent, 91.5 g, 51 mmoles carboxyl) and dihydroxy terminated polypropylene fumarate (1300 MW; 51.5 percent, 97.5 g, 150 mmoles —OH). The kettle was heated under vacuum at 150° to 160° C. for two hours to remove water. The product was transferred to a suitable container. The block copolymer had a flexible polymer to unsaturated polyester weight ratio of 0.9 to 1.0. This composition contained ABA block copolymers.

EXAMPLE 6

Poly(propylene fumarate)-b-poly(butadiene-co-acrylonitrile) block copolymer

The above block copolymer was prepared by charging a 1.5-L resin kettle with 508 g (726 mmoles —OH) of unsaturated polyester (dihydroxy terminated polypropylene fumarate, approximately 1400 MW) 404 g (234 mmoles carboxyl of Hycar 1300×13 (dicarboxy terminated polybutadiene-co-acrylonitrile, 26 percent AN content), 0.4 g benzoquinone, and 0.4 g of triphenylphosphonium bromide. The mixture was stirred and heated to 150° C. under vacuum for four hours. After cooling to room temperature, 508 g of styrene was added and mixed to dissolve the polymer. The product was transferred to a suitable container. The block copolymer had a flexible polymer to unsaturated polyester ratio of 0.8 to 1.0, and contained 57 percent solids in styrene. This composition contained ABA block copolymers.

EXAMPLE 7

Poly(propylene fumarate)-b-poly(tetrahydrofuran)-b-poly(propylene fumarate) triblock The above triblock was prepared by combining 400 grams of isocyanate-terminated poly(tetrahydrofuran 347 mmoles NCO), available from Air Products under the trademark PET90A, 312 grams of toluene, 3 grams of DABCO T9® catalyst, available from Air Products and Chemical Inc., and 224 grams of a solution of monohydroxy-terminated poly(propylene fumarate) (80 percent solids in styrene, 347 mmoles total —OH) in a one liter resin kettle equipped with nitrogen purge, a heating mantle, and a stirrer. The reagents were thoroughly mixed at room temperature under nitrogen, after which the contents were heated and maintained at 40° C. until the reaction was complete. The progress of the reaction was monitored using FTIR. Completion of the reaction was marked by the disappearance of the —NCO absorbance from the IR spectrum, at which time the product was cooled to room temperature. This triblock copolymer had a flexible polymer to unsaturated polyester ratio of approximately 2 to 1.

EXAMPLE 8

A poly(propylene fumarate)-b-poly(butadiene)-b-poly(propylene fumarate) triblock The above triblock was prepared by combining, in a one liter resin kettle equipped with nitrogen purge, heating mantle, and stirrer, 500 grams of hydroxy-terminated polybutadiene (137 mmoles total OH), available from the BFGoodrich Chemical Company under the trademark HYCAR 2,000×169®, 310 grams of toluene, 31 grams of isophorone diisocyanate having 279 mmoles total —NCO, and 3 grams of DABCO T9® catalyst. The contents were thoroughly mixed under nitrogen, and then warmed to 60° C. for 2.5 hours. To the kettle were added 93 grams of a solution of monohydroxy-terminated poly(propylene fumarate) (80 percent solids in styrene, 144 mmoles total —OH), and 150 grams of toluene to reduce the viscosity. The contents were reacted for about 3 hours at 60° C. until the IR spectrum indicated complete consumption of —NCO. The product was then cooled to room temperature. This triblock copolymer had a flexible polymer to unsaturated polyester ratio of 6.2 to 1.0.

EXAMPLE 9

Hydroxypropylmaleate-b-Poly(diethyleneadipate)-b-hydroxypropylmaleate triblock

A 1-quart polymerization bottle was charged with 156.5 g (313 mmoles —OH) of Formrez 11–112 (a dihydroxy poly(diethylene adipate), available from Witco Chemical Co.), 30.7 g of maleic anhydride (313 mmoles), 124 g of toluene as solvent, and 0.3 g of tetrabutyl titanate catalyst. The bottle was sealed and heated in a waterbath to 80° C. On completion of the reaction of the maleic anhydride as determined by FTIR, 19.1 g of propylene oxide (329 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 3.1 to 1.

EXAMPLE 10

Hydroxypropylmaleate-b-Poly(propylene adipate)-b-hydroxypropylmaleate triblock

A 1-quart polymerization bottle was charged with 407.3 g (1.63 mmoles —OH) of Formrez 33–225 (a dihydroxy poly(propylene adipate), available from Witco Chemical Co.), 160.1 g maleic anhydride (1.63 mmoles), 153 g toluene as solvent, and 1.7 g of tetrabutyl titanate catalyst. The bottle was sealed and heated in a waterbath to 80° C. On completion of the reaction of the maleic anhydride as determined by FTIR, 94.7 g of propylene oxide (1.63 mmoles) was charged to the bottle, and the reaction completed at 65° C. Determination of acid number and NMR indicated 100 percent maleic anhydride capping, and approximately 80 percent hydroxypropyl ester formation. This triblock copolymer had a flexible polymer to unsaturated polyester ratio of approximately 1.6 to 1.

The above-identified diblock and triblock, etc., polyester-flexible polymer copolymers can be utilized as toughening agents in a variety of plastics such as unsaturated polyesters or vinyl ester resins. Moreover, they can be directly applied to a fiber structure and cured to coat the same and alleviate stress cracking on the surface of the fibers. Subsequently, the fiber structure coated with the cured polyester-flexible polymer block copolymers of the present invention can be utilized in various matrix formations such as in thermoset sheet molding coatings, in the preparation of sheet resins containing fiber reinforcement therein, in the preparation of fiber structures utilized in mats, nonwovens, wovens, and the like, in wet lay-up sheets, in resins utilized in injection molding, bulk molding, and the like.

DETAILED DESCRIPTION OF A TOUGHENED COMPOSITION

The invention described herein addresses the deficiencies of SMC by providing a tougher matrix, one which has a greater elongation at failure while still retaining good strength and modulus. Toughness is commonly defined as the area contained under a stress-strain curve at a given point, in this case, failure. Although it is well known that toughness may be improved through a high elongation material with very low modulus, that is not acceptable for the contemplated uses of the unsaturated polyesters of this invention. Therefore, a high modulus must be retained along with improved elongation to find usefulness as a molded material.

This improved elongation to failure is achieved by incorporating one of the above described ABA block copolymers, wherein the A blocks have an average molecular weight from about 100 to about 500 or 600, into unsaturated polyester or vinyl ester molding compositions with or without fibers such as sheet molding compounds, thick molding compounds, and resin transfer molding compounds. The application is for the ABA block which may have a trace amount of AB or A(BA)$_n$ block copolymers present as by-products of the manufacturing chemistry.

These terminally reactive polymers lack internal unsaturation of the type that participates in crosslinking with ethylenically unsaturated monomers under the typical free radical polymerization conditions of unsaturated polyesters. These materials have good solubility in polyester resin/styrene solutions and do not phase separate on standing. The viscosities of mixtures containing the novel materials are not significantly greater than a control recipe. The addition of these materials does not lead to high shrinkage, and can even reduce the need for low profile additives (LPA) additives added to the composition to control shrinkage. This latter property of the invention is of particular importance in the fabrication of automotive body panels.

The materials which are this invention possess unsaturation which is exclusively at the end blocks of the copolymer chains and not present in the B blocks as is typical of the prior art. Addition of these materials to mixtures of common internally unsaturated polyesters and subsequent cure leads to thermoset networks with a greater diversity of molecular weight between cross-links (lower cross-link density) than the typical unsaturated polyester.

The typical unsaturated polyester resin develops many crosslinks along the backbone of the polymer using its unsaturation as crosslinking sites. In that the ABA block copolymers wherein the B block is saturated or contains aromatic polyester segments which lack these internal reactive unsaturation points, they only become crosslinked through their terminal fumarate of maleate groups. The polymer network formed from the interaction of the traditional unsaturated polyester and the ABA block copolymers during crosslinking is believed to consist of both unsaturated polyesters with their higher crosslink density (equivalent to low molecular weight between crosslinks) and the ABA block copolymers with lower crosslink density (equivalent to higher molecular weight between crosslinks). The actual molecular weight between crosslinks of the ABA block copolymers is controlled by the molecular weight of the B block as they lack crosslinking sites.

When the ABA's B block has different molecular weight than the molecular weight between crosslinks developed in the unsaturated polyester, a bimodality can be developed in the molecular weight between crosslinks within the crosslinked composition.

The ABA block copolymer additives of this invention achieve greater elongation while only decreasing modulus slightly. Further, the properties of the cured network are dependent on the flexibility, molecular weight, and concentration of the novel vinyl-terminated polyester. In this manner a rigid unsaturated polyester with utility for automotive body panels may be made more flexible, its elongation at failure increased, and its overall properties improved without loss of surface quality.

An alternative way to express the size of the A block is through the number of ester repeat units. Each ester repeat unit is composed of one molecule of the diol component and one molecule of the diacid component. The diol component can be a diol or a ring opened alkylene oxide. The diacid component can be from a diacid or an anhydride. The A block can also have additional ½ ester units if an unequal number of diol and diacid components are used. For ester units having a molecular weight of less than 200, this is from 1 to 3 ester repeat units. These low molecular weight A blocks are referred to as polyester condensation products having a particular molecular weight range made from the reaction of alkyl diols or alkylene oxides and dicarboxylic acids or their anhydrides. The block copolymers can be added to the other components in pure form or predissolved in ethylenically unsaturated monomers.

The above "Detailed Description" with regard to making and characterizing these block copolymers. The B block for this embodiment is generally a saturated polyester having a low Tg of about 0° C. or less, and preferably less than −20°

C. Low amounts of aromatic diacids or their anhydrides can be substituted for the saturated diacids as described in the Detailed Description.

The B block is a saturated polyester made from dicarboxylic acids or their anhydrides and glycols. The dicarboxylic acids or their anhydrides can include up to 30 or 40 weight percent, based on the weight of all the dicarboxylic acids and their anhydrides in the B polymer block of aromatic dicarboxylic acids or their anhydrides. These B blocks can be of about 500 to about 5,000, desirably about 500 to about 2,000, and preferably about 500 to about 1,500 molecular weight. In the preferred embodiment, the A block is made by an in situ reaction of the unsaturated polyester precursor molecules with the already formed saturated polyester B block as described in the Detailed Description. Preferably, this in situ reaction is achieved by sequentially reacting the two components of the unsaturated polyester with the B block. If the B block is hydroxyl terminated then one would react first the dicarboxylic anhydride with the B block to form a carboxyl terminated block and then reacting that with the cyclic alkylene oxide. If the B block is carboxyl terminated, the process is reversed. This process could be done multiple times but the preferred product has a single unit block of the anhydride cyclic alkylene oxide reaction product. This process is preferable to simultaneously adding the dicarboxylic anhydride with the cyclic alkylene oxide because the simultaneous addition forms unsaturated polyesters that are not chemically bound to the B block. Thus, the sequential addition assures more complete reaction of the B block and less formation of polymeric side products. The sequential addition is shown in Examples 9 and 10. In this embodiment with in situ reaction, the average molecular weight of the A blocks is from about 100 to about 500 or 600.

Unsaturated polyester compositions as used in this specification are well known and refer to compositions of unsaturated polyester resins, ethylenically unsaturated monomers, optional low profile additives, and free radical generating molecules. Vinyl ester resins can partially or fully replace on a weight basis the unsaturated polyester resin for some uses. The composition can be filled with various organic and inorganic fillers and reinforced with fibers.

Preferred unsaturated polyester compositions are described by E. Melby and J. Castro entitled "Glass-Reinforced Thermosetting Polyester Molding: Materials and Processing" in volume 7 of *Comprehensive Polymer Science* published by Pergamon Press: Oxford, 1989, pp 51–109, which is hereby fully incorporated by reference.

Preferred amounts of the various components in a polyester molding composition is best expressed in parts by weight. The standard resin or polymer forming components are the unsaturated polyester or vinyl ester resin and ethylenically unsaturated monomers. The amounts specified below and in the claims will be amounts of the chemical compound and will not include solvents or diluents unless otherwise noted.

The unsaturated polyester or vinyl ester resin is desirably present from about 25 to about 60 parts, and preferably from about 35 to about 50 parts by weight. The ethylenically unsaturated monomers are desirably present from about 40 to about 75 parts, and preferably from about 40 to about 65 parts by weight. The low profile additive is desirably present up to 40 parts and preferably from about 10 to about 30 parts by weight. The above parts by weight are based on 100 parts total weight of the unsaturated polyester or vinyl ester resin and the ethylenically unsaturated monomers.

The ABA, or ABA with trace amounts of AB or A(BA)$_n$ block copolymers can be present from about 1 to about 50 parts, desirably from about 5 to about 40, and preferably from about 10 to about 30 parts by weight based upon 100 parts by weight of the unsaturated vinyl ester resin and the ethylenically unsaturated monomers. With the preferred ratios of B block to A blocks, this would yield an unsaturated polyester composition with from about 1 to about 49 parts by weight B block, desirably from about 5 to about 38 parts by weight B block, and preferably from about 10 to about 28 parts by weight B block based upon 100 parts by weight of the unsaturated polyester and ethylenically unsaturated monomers.

Suitable unsaturated polyester resins which can be utilized in the polyester molding composition are well known to the art and to the literature and include products of the condensation reaction of low molecular weight diols (that is, diols containing from 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids and anhydrides contain unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is 1,2-propylene glycol. Mixtures of diols may also be advantageously used. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, terephthalic acid, isophthalic acid, adipic acid, glutaric acid, and the like. The condensation reactions are catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043, which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e., from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3. An excess of oxirane is preferred in the preparation of the polyesters so that the final product has a low content of carboxylic acid end groups and a high content of hydroxyl end groups.

In the preparation of the unsaturated polyesters from oxiranes and anhydrides, small amounts of initiators are utilized as from about 5 to about 30 parts by weight per 100 parts by weight of the polyester forming monomers. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, with the like, as described in U.S. Pat. No. 3,538,043 which is hereby fully incorporated by reference. Regardless of whether an unsaturated polyester made from an oxirane or a diol is utilized, the molecular weight thereof is from about 500 to about 10,000 and preferably from about 1,000 to about 5,000.

Another important component is an ethylenically unsaturated monomers which includes crosslinking agents such as a polymerizable vinyl or allyl compound, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methyl acrylate, ethyl acrylate, and the like; and other unsaturated monomers including vinyl acetate, diallyl maleate, diallyl fumarate, and the like. Mixtures of the above compounds can also be utilized. The preferred ethylenically unsaturated monomer is styrene and mixtures of styrene and other monomers where styrene is at least 50 weight percent, desirably at least 75 weight percent, and preferably at least 85 weight percent of the ethylenically unsaturated monomers.

Fibers can be added to the composition for added strength and stiffness. Examples of fibers which can be utilized in this invention generally include any reinforcing fiber such as glass, aramid, nylon, polyester, graphite, boron, and the like. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class is chopped strands, random or wound continuous filaments or rovings, reinforcing mats, nonreinforcing random mats, fiber bundles, yarns, non-woven fabrics, etc. Coated fiber bundles, comprising about 5 to about 50 or 150 strands, each having about 10 to about 50 fibers, highly bonded together with a conventional sizing agents such as various amino silanes, are preferred. Chopped glass fibers are preferred with a desirable length of ½" to 2" and preferably 1".

The fiber structure may be randomly distributed within the matrix or be arranged in selected orientations such as in parallel or cross plies or arranged in mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Optionally, various other components or additives can be utilized to form the molding compound composition. For example, various thermoplastic polymers (low profile or low shrinkage compounds) can be utilized. Typical low profile compounds include polyvinyl acetate, saturated polyesters, polyacrylates or polymethacrylates, saturated polyester urethanes, and the like.

Other additives which can also be utilized are known to the art and to the literature and include internal mold release agents such as zinc stearate; viscosity reducers or viscosity modifiers; free radical inhibitors; mineral fillers such as calcium carbonate, Dolomite, clays, talcs, zinc borate, perlite, vermiculite, hollow glass, solid glass microspheres, hydrated alumina, and the like. The mold release agent and viscosity modifiers are used in effective amounts. The typical viscosity reducers used in this specification are long chain aliphatic monocarboxylic acids or saturated polyesters with acid groups. The fillers can be present from 0 to about 80 weight percent, and desirably from 20–70 weight percent of the total composition weight. Free radical inhibitors are included to modify cure cycles by providing cure delay and moderating the cure exotherm. These free radical inhibitors can be present from 0.001 to 0.2 parts per 100 parts by weight of ethylenically unsaturated monomers and unsaturated polyester resin or vinyl ester resin. The free radical inhibitors include benzoquinone, hydroquinone, and similar substituted quinones.

In addition to unsaturated polyesters, other suitable matrix materials include vinyl ester resins. The general structure of a typical vinyl ester resin, whose size can vary depending on the number of monomer units (where n=1, 2, or 3 and preferably n=1), is

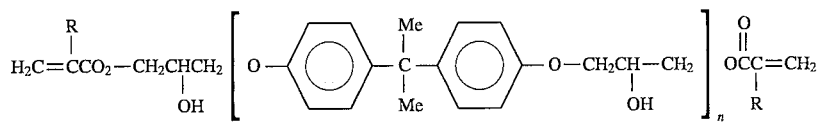

where R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be cross-linked with styrene in the same fashion as an unsaturated polyester. These vinyl ester resins can be used as a partial or full replacement for the unsaturated polyester resin previously specified.

Conventional catalysts can be used to cure the composition. Examples of such catalysts for the cure of unsaturated polyester or vinyl ester resins include organic peroxides and hydroperoxides such as benzoyl peroxide, dicumyl peroxide, cumene hydroperoxide, tertbutylperbenzoate, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like. When curing is done in a mold at elevated temperatures, then the temperature can desirably vary from about 30° C. to about 160° C. and is preferably from about 80° C. to about 150° C. Alternatively, when photo sensitive agents are used, lower temperatures can be used. The amount of catalyst used can vary from about 0.1 to about 5 parts and is desirably 0.5 to about 2.0 parts by weight per 100 parts of resins and polymer forming components in the composition.

The general procedure for mixing the polyester networks involves dissolving the unsaturated polyester; the ABA block copolymers, and the other polymeric components in the ethylenically unsaturated monomers. The composition is then well mixed. The catalyst for the free radical crosslinking reaction can be added to the mix at any of the various stages so long as the temperature of the mix is not so high as to start free radical crosslinking. Fillers, fibers, inhibitors, and maturation agents can also be added at this stage.

Compositions made in accordance with the invention can be utilized in wet layup, resin transfer molding, filament winding, bulk molding, sheet molding, thick molding, and the like. The composite material of the invention provides a toughened molding material having better crack resistance (i.e., higher strain to failure) and can be molded into automotive body panels, automotive structural components, grille and headlamp assemblies, hoods, doors, food trays, machine covers and guards, bathroom components, aircraft components, various electrical and household components, sporting goods, etc. Since the ABA block copolymers are themselves polyesters, they do not phase separate into separate domains during curing as copolymers based on poly(diene) polymers or copolymers. Thus these ABA block copolymers form a single phase cured unsaturated polyester composition with ethylenically unsaturated monomers and unsaturated polyester resin or vinyl ester resin.

The ABA block copolymers of the Detail Description were formulated into SMC compounds below and the various physical properties were evaluated. The compositions are reported first without reinforcing fibers as this simplifies the interpretation of physical tests and gives a true representation of the filled matrix performance. In a later section, the surface quality of fiber reinforced samples is compared. For ease of handling, many of the SMC components are commercially prepared as solutions in styrene and are labelled indicating the weight percent of the component and styrene.

The flexural and tensile properties were measured using ASTM D790 and D638-89, respectively.

Formulation b

Hydroxypropylmaleate-p-Poly(diethyleneadipate)-b-hydroxypropylmaleate triblock of Example 9 was formulated into an unsaturated polyester using the recipe of Table 1 formulation b and f. The modifier of Example 9 was substituted at the 20 weight percent level for a portion of the unsaturated polyester A, poly(vinyl acetate) low profile additive, styrene, and divinylbenzene. Physical properties of this unsaturated polyester composition are shown in Table 2. The formulation b shows increased Flexural strain at both 23° C. and 150° C. It shows increased Tensile elongation at 150° C. with only a slight drop in Tensile strength at 150° C.

TABLE 1

| For-mulation | a (Control) | b 20% Sub | c 20% Sub | d 10% Sub | e 20% Sub | f ≈ 20% Sub |
|---|---|---|---|---|---|---|
| Component Unsaturated Polyester A | 157.5 | 126.0 | 126.0 | 141.8 | 121 | 133.2 |
| Modifier of Example 9 | — | 59.5 | — | — | — | 58.2 |
| Modifier of Example 10 | — | — | 59.5 | 29.7 | 58.5 | — |
| Low Profile of 40 wt % resin in styrene Additive | 109.5 | 87.6 | 87.6 | 98.6 | 64.5 | 77.5 |
| Styrene | 16.5 | 13.2 | 13.2 | 14.8 | 40.0 | 24.2 |

TABLE 1-continued

| Formulation | a (Control) | b 20% Sub | c 20% Sub | d 10% Sub | e 20% Sub | f ≈ 20% Sub |
|---|---|---|---|---|---|---|
| Divinylbenzene | 14.0 | 11.2 | 11.2 | 12.6 | 13.5 | 5.9 |
| 10% Benzoquinone | 1.0 | 1.0 | 1.0 | 1.0 | 1.0 | 1.0 |
| Diallyl Phthalate | | | | | | |
| Tertiary Butyl Perbenzoate | 3.0 | 3.0 | 3.0 | 3.0 | 3.0 | 3.0 |
| Lupersol 256 Peroxide Initiator | 1.5 | 1.5 | 1.5 | 1.5 | 1.5 | 1.5 |
| Viscosity Reducer | 10.0 | 10.0 | 10.0 | 10.0 | 10.0 | 10.0 |
| Zinc Stearate | 12.0 | 12.0 | 12.0 | 12.0 | 12.0 | 12.0 |
| $CaCO_3$ | 662.0 | 662.0 | 662.0 | 662.0 | 662.0 | 665.5 |
| MgO dispersion 35% by wt. in styrene and carrier resins | 13.0 | 13.0 | 13.0 | 13.0 | 13.0 | 8.0 |
| TOTAL: | 1000.0 | 1000.0 | 1000.0 | 1000.0 | 1000.0 | 1000.0 |

(The unsaturated polyester "A" is of MW approximately 1200–1600 made from propylene and other diols and fumaric acid. It is 65 weight percent polyester and 35 weight percent styrene. It is available commercially.) The viscosity reducer is a saturated polyester with pendant acid groups as defined in the specification.

TABLE 2

PHYSICAL PROPERTIES OF MOLDED SAMPLES, FORMULATED BY RECIPE IN TABLE 1

| Formulation | a (Control) | b 20% Substitution |
|---|---|---|
| Flexural (23° C.) | | |
| Modulus (Mpsi) | 0.74 ± 0.03 | 0.29 ± 0.01 |
| Strength (psi) | 5645 ± 480 | 2962 ± 63 |
| Strain % | 0.98 ± 0.09 | 1.88 ± 0.15 |
| Flexural (150° C.) | | |
| Modulus (Mpsi) | 0.11 ± 0.01 | 0.07 ± 0.01 |
| Strength (psi) | 1260 ± 100 | 1086 ± 92 |
| Strain % | 1.67 ± 0.08 | 2.61 ± 0.28 |
| Tensile (150° C.) | | |
| Strength (psi) | 665 ± 106 | 595 ± 30 |
| Elongation % | 0.57 ± 0.01 | 1.65 ± 0.20 |

Formulations c, d, and e

Hydroxypropylmaleate-b-Poly(propylene adipate)-b-hydroxypropylmaleate triblock of Example 10 was formulated into an unsaturated polyester using the recipe of Table 1 formulations c, d, and e where the substitution is based on 20, 10, and 19.7 percent of the other first four components. The physical properties are shown in Tables 3 and 4. In Table 3, the physical properties of formulations c and d show significant variation with the weight percent substitution of the block copolymer for the traditional polymer forming components of the formulation. This allows one to custom formulate for the desired properties at 23° C. and 150° C. The Flexural strains and Tensile elongation are increased significantly over the control. The Tensile 150° C. strength is not significantly changed while achieving this higher elongation. The low percent shrinkage on cure values for formulation c and d is desirable for the production of molded parts with a smooth, low waviness surface.

TABLE 3

PHYSICAL PROPERTIES OF MOLDED SAMPLES, FORMULATED BY RECIPE IN TABLE 1

| Formulation | a (Control) | c 20% Substitution | d 10% Substitution |
|---|---|---|---|
| Flexural (23° C.) | | | |
| Modulus (Mpsi) | 0.82 ± 0.05 | 0.39 ± 0.02 | 0.59 ± 0.04 |
| Strength (psi) | 5110 ± 390 | 4251 ± 187 | 5192 ± 38 |
| Strain % | 0.80 ± 0.10 | 1.70 ± 0.10 | 1.34 ± 0.10 |
| Rel. Energy at Failure | 1.00 | 1.77 | 1.65 |
| Tensile (150° C.) | | | |
| Strength (psi) | 700 ± 65 | 596 ± 51 | 746 ± 14 |
| Elongation % | 1.05 ± 0.25 | 1.51 ± 0.25 | 1.42 ± 0.28 |
| % Shrinkage on cure | 0.06 ± 0.01 | 0.02 | 0.03 |

TABLE 4

PHYSICAL PROPERTIES OF MOLDED SAMPLES, FORMULATED BY RECIPE IN TABLE 13

| Formulation | a (Control) | c 19.7% Substitution |
|---|---|---|
| Flexural (23° C.) | | |
| Modulus (Mpsi) | 0.74 ± 0.03 | 0.47 ± 0.01 |
| Strength (psi) | 5646 ± 477 | 4885 ± 169 |
| Strain % | 0.98 ± 0.09 | 1.45 ± 0.07 |
| Rel. Energy at Failure | 1.00 | 1.32 |
| Flexural (150° C.) | | |
| Modulus (Mpsi) | 0.11 ± 0.01 | 0.09 ± 0.01 |
| Strength (psi) | 1260 ± 100 | 1233 ± 171 |
| Strain % | 1.67 ± 0.08 | 1.96 ± 0.44 |
| Tensile (150° C.) | | |
| Strength (psi) | 665 ± 106 | 736 ± 62 |
| Elongation % | 0.86 ± 0.33 | 1.45 ± 0.19 |
| % Shrinkage on cure | 0.06 ± 0.01 | 0.10 ± 0.01 |

In Table 4, the physical properties of formulation e show significant increases in the Flexural strain and Tensile elongation over the control sample. The low percent shrinkage on cure value for formulation e as compared to the control indicates the material when formulated into products will have good surface quality. Formulation e has only 59 weight percent of the low profile agent found in the control.

Formulation f

Hydroxypropylmaleate-b-poly(diethyleneadipate)-b-hydroxypropylmaleate triblock of Example 9 was formulated into an unsaturated polyester using the recipe in Table 1, formulation f. The modifier was substituted at approximately 20 weight percent level for a portion of the unsaturated polyester A, poly(vinyl acetate) low profile additive, styrene, and divinylbenzene. The physical properties of this cured composition are given in Table 5, formulation f. The data show formulation f has high elongation and strain at 23° C. and 150° C. Formulation f also had low percent shrinkage on cure and similar viscosity to the control.

Figure 2:
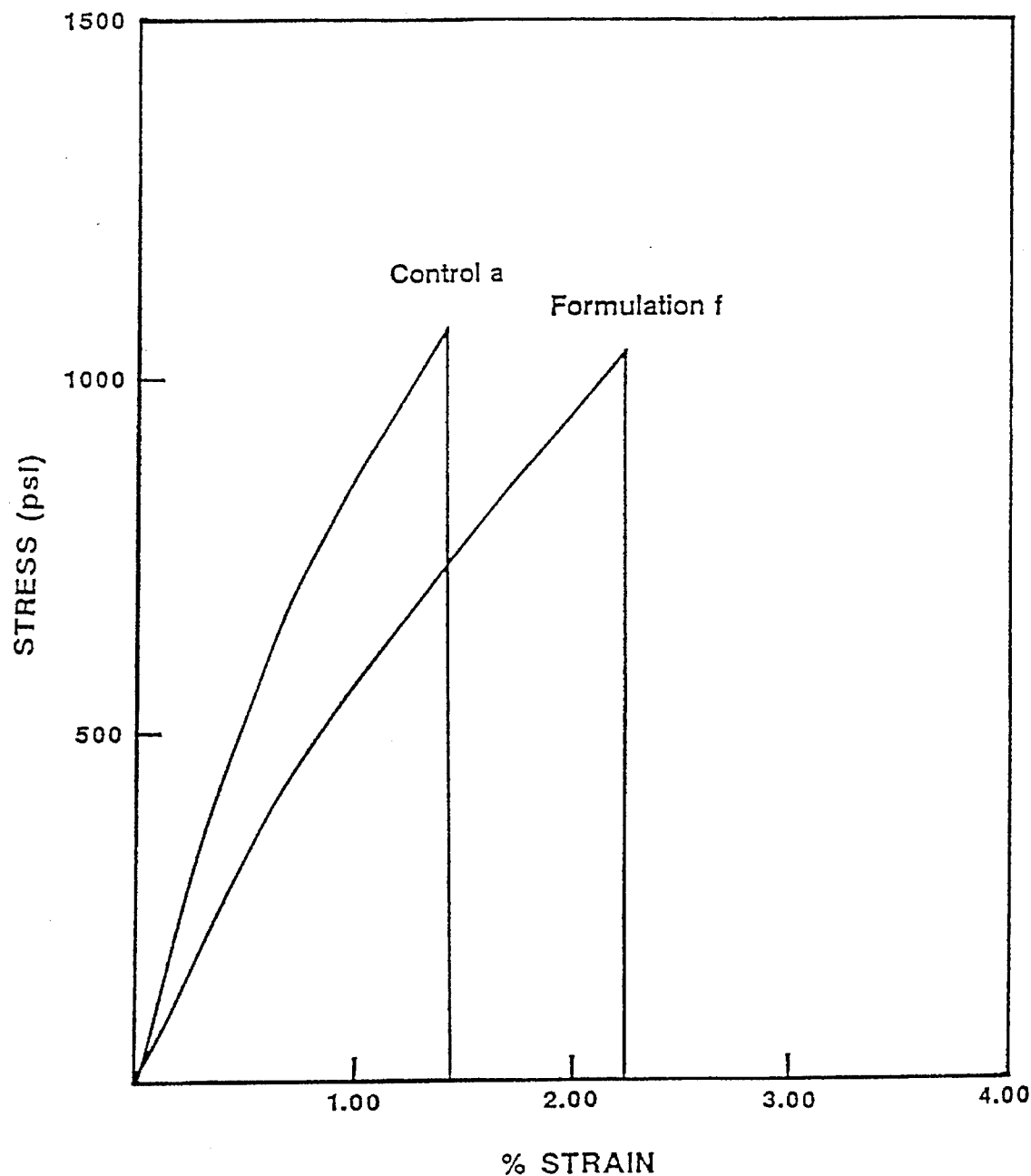
Figure 3:
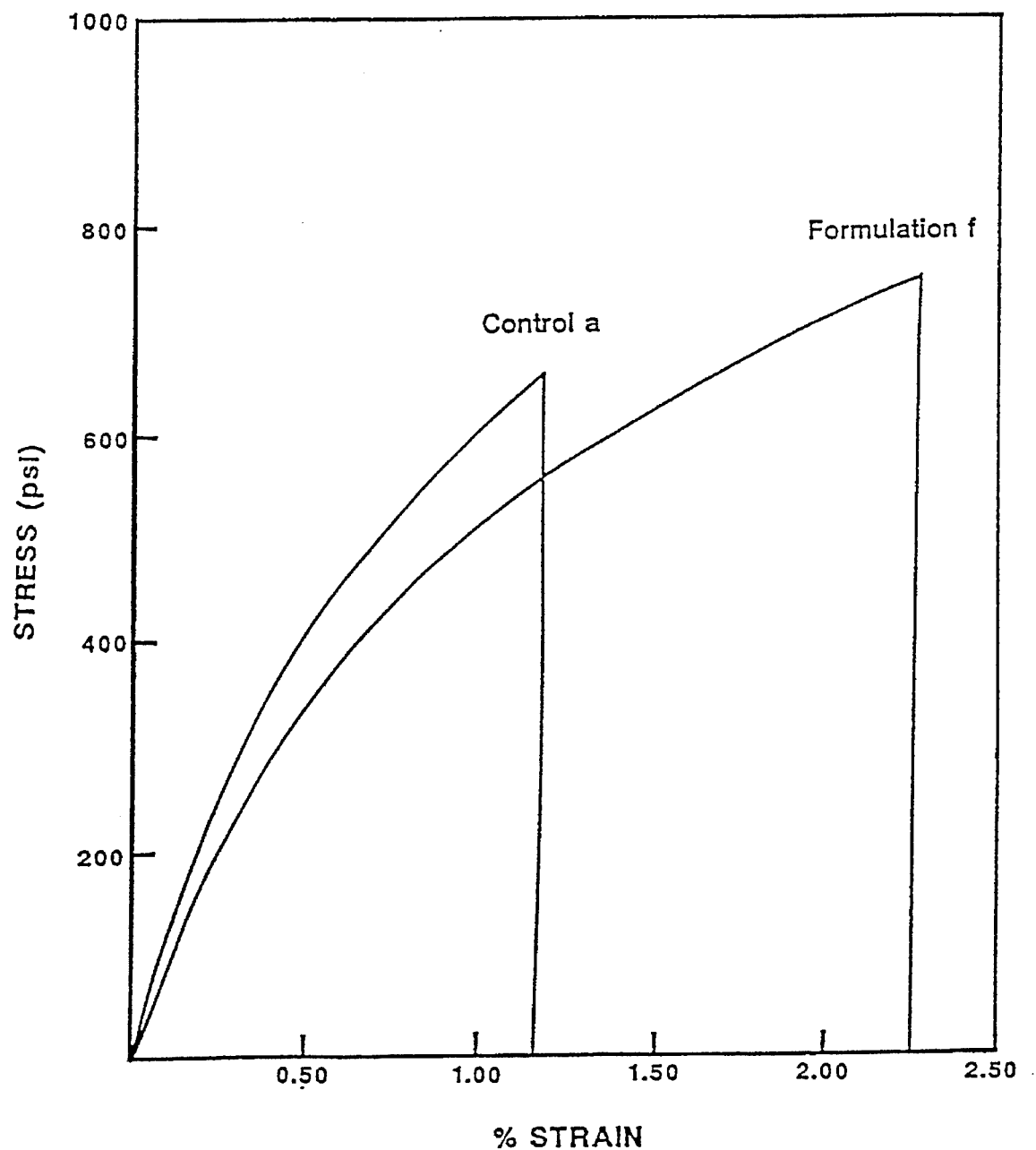

The flexural and tensile stress/strain curves used to generate Table 5 are shown in FIGS. 1,2, and 3. The area under the stress/strain curves is often associated with the toughness of a composition. As seen in these curves, formulation f has significantly more toughness and area under the stress strain curve at 23° C. and 150° C. by flexural stress/strain, and at 150° C. by tensile stress/strain. Formulation f shows this increased toughness while maintaining approximately the same strength or increased strength at 150° C. Prior art modifications of unsaturated polyester composition increased strain or elongation but caused more significant losses in 150° C. modulus and strength.

TABLE 5

PHYSICAL PROPERTIES OF MOLDED SAMPLES FORMULATED BY RECIPE IN TABLE 1

| Formulation | Control | f ≈ 20% Sub. |
|---|---|---|
| Flexural (23° C.) | | |
| Modulus (Mpsi) | 0.78 | 0.42 |
| Strength (psi) | 5,330 | 3,763 |
| Strain (%) | 0.78 | 1.67 |
| Rel. Energy at Failure | 1.00 | 1.75 |
| 150° C. Flexural | | |
| Modulus (Mpsi) | 0.12 | 0.07 |
| Strength (psi) | 1,027 | 1,091 |
| Strain (%) | 1.28 | 2.29 |
| Rel. Energy at Failure | 1.00 | 1.85 |
| 150° C. Tensile | | |
| Modulus (Mpsi) | 0.12 | 0.10 |
| Strength (psi) | 630 | 711 |
| Elongation (%) | 1.23 | 2.04 |
| Rel. Toughness | 1.00 | 2.01 |
| % Shrinkage on Cure | 0.06 | 0.08 |
| Initial Viscosity of Paste, 35° C. (cps) | 16,000 | 17,000 |

The example compositions previously shown were without reinforcing fibers as this simplified the interpretation of the physical tests. In Tables 6 and 7, the percent strain to crack and surface quality of fiber glass reinforced versions on control "a" and formulation f are compared. Formulation f was reinforced with two different amounts of glass fiber bracketing the amount of glass fiber in the control. These two versions of formulation f give some idea of the sensitivity of the tests to small variations in glass fiber content and their inherent reproducibility.

Table 6 shows the formulation f with glass fibers has a higher percent strain to first crack and to multiple cracks to failure. Table 7 shows the Loria™ surface smoothness of the fiber glass reinforced cured formulations. The Loria™ Ashland Index test is a method and equipment developed by Ashland Chemical Co. to measure short-term waviness of molded fiber reinforced thermoset plastic articles. Loria™ Ashland Index values of greater than 100 can be visually observed as unacceptable smoothness in painted automotive body panels for some applications. The Ashland Index values for formulation f are significantly smaller than the control, indicating the surface is smoother. In fact, the Ashland Index of the mold surfaces are typically about 40, which is not much better than formulation f. The Definition of Image is higher for formulation f, which is better than the control. Similarly, the Orange Peel test indicates better surface quality for formulation f with glass fibers than for the control with glass fibers.

TABLE 6

ELLIPTICAL MANDREL BENDING TEST OF MOLDED SAMPLES WITH GLASS FIBER REINFORCEMENT

| SMC | Glass (wt. %) | % Strain at First Crack | % Strain at Multiple Cracks to Failure |
|---|---|---|---|
| Control | 28 | 0.48 ± 0.03 | 0.93 ± 0.05 |
| Formulation f with glass fibers | 29 | 0.63 ± 0.08 | 1.99 ± 0.13[a] |
| Formulation f with glass fibers | 27 | 0.67 ± 0.08 | 1.54 ± 0.27 |

[a]Limit of testing mandrel, cracking not as pronounced as other specimens. Additional information on the Elliptical Mandrel Bending Test can be found in Atkins, K., et at., 46th Ann. Conf. Reinf. Plastics/Composites Institute, SPI, Session 16-D, 2/18–21/91,and General Motors Manufacturing Dev., Md-079-006, pp.27, B1–B8.

TABLE 7

LORIA™ SURFACE SMOOTHNESS OF MOLDED SAMPLES WITH GLASS FIBER REINFORCEMENT

| SMC | Glass (wt. %) | Ashland Index[a] | Definition of[b] Image | Orange peel[c] |
|---|---|---|---|---|
| Control | 28 | 81 ± 5 | 90 ± 2 | 8.7 ± 0.02 |
| Formulation f with glass fibers | 29 | 53 ± 6 | 95 ± 1 | 9.4 ± 0.01 |
| Formulation f with glass fibers | 27 | 53 ± 2 | 96 ± 1 | 9.5 ± 0.01 |

[a]"Smoothness" - Smaller number is smoother surface.
[b]"Glossiness" - Definition of Reflected Image; larger number is better.
[c]"Orange Peel" or Moderate-Term Waviness - larger number is better.

These modified unsaturated polyester or vinyl ester compositions with their higher flexural strain to failure can be utilized as automotive structural components such as load bearing support members, aircraft components, housing for various electrical and household goods, sporting goods such as golf club shafts, rackets, etc.

While in accordance with the Patent Statutes, the best mode and preferred embodiment has been set forth, the scope of the invention is not limited thereto, but rather by the scope of the attached claims.

What is claimed is:

1. A process for using an ABA block copolymer for making a toughened unsaturated polyester composition comprising: mixing an ABA block copolymer into an unsaturated polyester resin composition wherein the A block has molecular weight from about 100 to 600 and is a polyester consisting essentially of a condensation product of one or more saturated alkylene oxides or alkyl diols having up to 18 carbon atoms and one or more dicarboxylic acids or their anhydrides having 1 to 10 carbon atoms, wherein at least 50 mole percent of said dicarboxylic acids or their anhydrides have unsaturation, and the B block is a polyester free of internal unsaturation reactive in crosslinking reactions of unsaturated polyesters having a Tg of 0° C. or less.

2. A process according to claim 1, wherein the polyester B block has a Tg of below minus 20° C.

3. A process according to claim 1, wherein the ABA block copolymer is made by sequentially reacting a hydroxyl terminated polyester B block with said one or more dicarboxylic acids or their anhydrides of said A block creating a carboxyl terminated polyester and reacting said carboxyl terminated polyester with said one or more cyclic saturated alkylene oxides or alkylene diols of said A block.

4. A process according to claim 1, wherein said B block is a difunctional terminated polyester, wherein said ABA block copolymer is made by the sequential reaction of said B block with said one or more dicarboxylic anhydrides and said one or more cyclic alkylene oxides of said A block.

5. A process according to claim 4, wherein said A block is the reaction product of maleic anhydride and a cyclic alkylene oxide molecule having only 2 or 3 carbon atoms in the cyclic ring.

6. A process for using an ABA block copolymer to mold a toughened article, said process comprising:

forming and curing a shaped article from a thermosetting composition including an unsaturated polyester or vinyl ester resin or combinations thereof having an ABA block copolymer therein, wherein said ABA block copolymer has A blocks and a B block, said A blocks having a molecular weight from about 100 to 600 and consisting essentially of the condensation product of one or more alkyl diols or saturated alkylene oxides having up to 18 carbon atoms, one or more dicarboxylic acids or their anhydrides having 1 to 10 carbon atoms with at least 50 mole percent of the combined moles of said one or more dicarboxylic acids and their anhydrides in said A blocks being unsaturated, and said B block being a polyester free of internal unsaturation reactive in crosslinking reactions of unsaturated polyesters and having a Tg of 0° C. or less.

7. A process according to claim 6, wherein said thermosetting composition comprises a) from about 25 to about 60 parts by weight of said thermosetting unsaturated polyester or vinyl ester resin or combinations thereof b) from about 40 to about 75 parts by weight of one or more ethylenically unsaturated monomers, and c) optionally up to 40 parts by weight of a low profile additive wherein said ABA block copolymer is present from about 1 to about 50 parts by weight per 100 parts by weight of said combined resin and ethylenically unsaturated monomer.

8. A process according to claim 7 wherein the polyester B block has a Tg of below minus 20° C. and said thermosetting resin is an unsaturated polyester resin.

9. A process according to claim 7, wherein the ABA block copolymer was prepared by sequentially reacting a dihydroxyl terminated B block with said one or more dicarboxylic acids or their anhydrides of said A blocks creating a carboxyl terminated polyester and then reacting said carboxyl terminated polyester with said one or more cyclic saturated alkylene oxides or alkyl diols of said A blocks.

10. A process according to claim 7 wherein said thermosetting composition further comprises from about 5 to about 85 percent by weight of a fibrous reinforcing agent.

11. A process according to claim 10, wherein said toughened article is a fiber reinforced plastic article and said thermosetting composition before curing is a sheet molding compound.

12. A process according to claim 8, wherein said thermosetting composition is a sheet molding compound and further comprises from about 5 to 85 percent by weight of a fibrous reinforcing agent.

13. A process according to claim 9, wherein said B block has a Tg of below minus 20° C., said thermosetting resin is a unsaturated polyester resin.

14. A process according to claim 13, wherein said B block is a polyester reaction product from adipic acid and one or more of diethylene glycol, propylene glycol, and ethylene glycol.

15. A process according to claim 13, wherein said one or more dicarboxylic acids or their anhydrides of said A blocks include maleic anhydride and wherein said one or more saturated alkyl diols or saturated alkylene oxides of said A blocks include one or more saturated alkylene oxides.

16. A process according to claim 14, wherein said one or more dicarboxylic acids or their anhydrides of said A blocks include maleic anhydride.

17. In a process for using an ABA block copolymer to toughen a molding composition comprising molding and curing a fiber reinforced thermosetting molding composition comprising unsaturated polyester or vinyl ester resin or combinations thereof and one or more ethylenically unsaturated monomers, the improvement wherein said composition further comprises ABA block copolymers having A blocks and a B block, said B block having a Tg of 0° C. or less and being a polyester free of internal unsaturation reactive in crosslinking reactions of unsaturated polyester, said A blocks being 100 to 600 molecular weight polyesters consisting essentially of the condensation reacting product of one or more alkyl diols or saturated alkylene oxides having up to 18 carbon atoms and one or more dicarboxylic acids or their anhydrides having 1 to 10 carbon atoms, with at least 50 mole percent of the combined moles of said dicarboxylic acids and their anhydrides of the A blocks being unsaturated and wherein said ABA block copolymer was prepared by a sequential reaction of said B block with said one or more dicarboxylic anhydrides and said one or more cyclic alkylene oxides of said A block.

18. In a process according to claim 17, wherein the resin of the thermosetting molding composition is an unsaturated polyester resin, said molding composition is a sheet molding composition, and said molding composition includes 5 to 85 percent by weight of a fibrous reinforcing agent.

19. In a process according to claim 18, wherein said one or more dicarboxylic acids or their anhydrides of said A blocks include maleic anhydride and said B block has a Tg of less than minus 20° C.

20. In a process according to claim 19, wherein said B block is a polyester reaction product from adipic acid and one or more of diethylene glycol, propylene glycol, and ethylene glycol.

* * * * *